No. 835,664. PATENTED NOV. 13, 1906.
A. H. CONNELL.
COTTON CHOPPER.
APPLICATION FILED JULY 25, 1906.
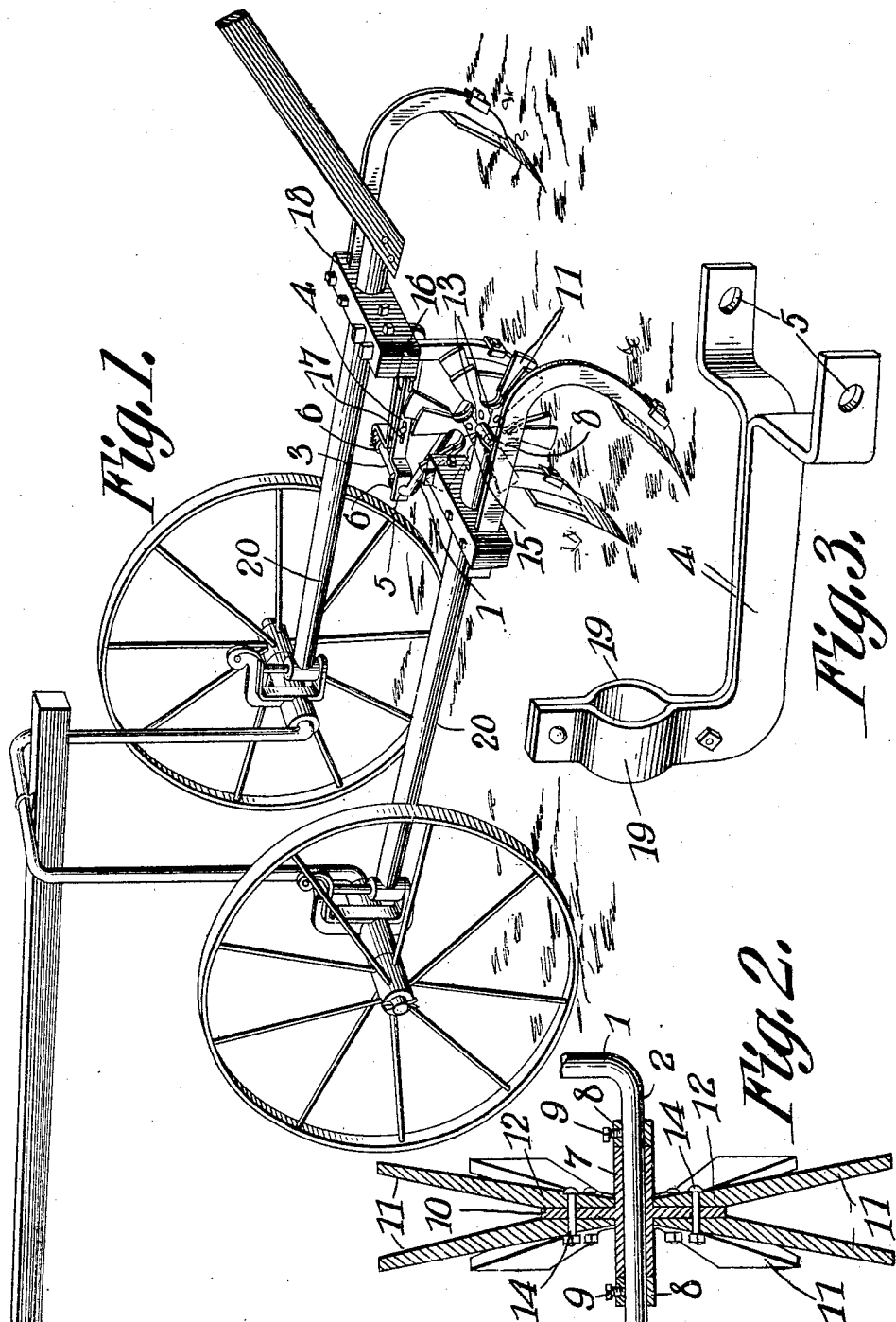
WITNESSES:
Alexander H. Connell, INVENTOR.
By C. A. Snow & Co.
ATTORNEYS

UNITED STATES PATENT OFFICE.

ALEXANDER HARDEE CONNELL, OF CLARKSVILLE, TEXAS.

COTTON-CHOPPER.

No. 835,664.　　　　　Specification of Letters Patent.　　　　　Patented Nov. 13, 1906.

Application filed July 25, 1906. Serial No. 327,710.

*To all whom it may concern:*

Be it known that I, ALEXANDER HARDEE CONNELL, a citizen of the United States, residing at Clarksville, in the county of Red River and State of Texas, have invented a new and useful Cotton-Chopper, of which the following is a specification.

This invention has relation to cotton-choppers; and it consists in the novel construction and arrangement of its parts, as hereinafter shown and described.

The object of the invention is to provide a cotton-chopper adapted to be attached to a double-shovel cultivator in such manner that as the cultivator is drawn over the ground the chopper will rotate in order to protect plants at intervals from the throw of the earth from the shovels and will permit the plants occurring between said intervals to be covered by the earth, and consequently destroyed.

The chopper consists of the novel construction and arrangement of its parts, as will be pointed out.

In the accompanying drawings, forming a part of this specification, Figure 1 is a perspective view of the cotton-chopper applied to a cultivator. Fig. 2 is a vertical sectional view of the chopper detached. Fig. 3 is a perspective view of a modified form of attaching means.

The shaft 1 is provided with the lower horizontal portion 2 and the upper horizontal portion 3. The arms 4 are provided at their ends with the perforations 5, in which the portion 3 of the shaft 1 is journaled and is held therein by means of the collars 6, which are attached to the said portion 3 by set-screws and bear against the inner faces of the said arms 4. The hub 7 is journaled upon the portion 2 and is retained in proper position by means of the collars 8. The said collars are fixed with relation to the portion 2 by means of the set-screws 9. The hub 7 is provided at an intermediate point with the annular flange 10.

The chopper-blades 11 are of special construction. In a transverse direction the said blades are thickest near their butt-ends, as at 12, and are gradually reduced in transverse direction toward their opposite ends. The ends 12 are provided with the radially-extending edges 13. The edges 13 of one blade may meet and abut against the edges 13 of the adjacent blade. Each blade 11 is secured to the flange 10 by means of the bolt or bolts 14, which pass transversely through the said flange and the end of the said blade. The blades are arranged in pairs oppositely disposed in a transverse direction upon the flange 10. Each blade is reduced in lateral dimension at the point 15, and the outer portion of the blade from the point 15 gradually increases in lateral dimension, so that the outer end of the blade is of the greatest lateral dimension. When the blades 11 are mounted upon the flange 10, the inclination of the under sides of the ends thereof pitch the blades on one side of the flange at an angle to the blades on the other side thereof.

It is obvious that as the cultivator is drawn along a row of plants (not shown) the shovels thereof will throw the earth toward the plants and that the ends of the blades 11 as they come in contact with the earth will straddle the plants at intervals and prevent the earth from being cast upon the plants thus protected, while those plants that occur in the spaces between the ends of the blades are covered with earth and are destroyed.

In the form of the invention as shown in Fig. 1 the arms 4 4 are bolted to the sides of the shank 16, the elongated bolt-perforations 17 being provided in order that the said arms may be adjusted longitudinally of the said shank. The shank 16 is provided with an upturned end, which is suitably secured in a perforation provided in the cross-bar 18 of the cultivator-frame.

In the form of support as shown in Fig. 3 the shank 16 is dispensed with; but the ends of the arms 4 4 are upturned and are provided with the recesses 19 19, which receive the side beam 20 of the cultivator. It will thus be seen that the chopper may be adjusted forwardly or rearwardly and by means of the collars 6 and 8 may be adjusted laterally.

Having described my invention, what I claim as new, and desire to secure by Letters Patent, is—

1. A cultivator attachment consisting of a shaft having horizontal portions, an arm journaled to one of the horizontal portions and adapted to be attached to the cultivator, a hub journaled upon the other horizontal portion and having blades with spaced outer ends.

2. A cultivator attachment consisting of a shaft having horizontal ends, an arm journaled to one end and adapted to be attached to the cultivator, a hub journaled upon the other horizontal end of the shaft, inclined blades attached to said hub and having their outer ends spaced apart in lateral and forward directions.

3. A cultivator attachment consisting of a shaft having horizontal ends, an arm journaled to one end of the shaft and adapted to be attached to the cultivator, a hub journaled directly upon the other end of said shaft, means for adjusting said hub laterally upon the shaft, blades carried by the hub and having their outer ends spaced apart.

4. In a device such as described, a hub suitably journaled, a flange carried by said hub, blades attached to said flange and being arranged on opposite sides thereof in positions opposite to each other and converging toward each other at their inner ends.

In testimony that I claim the foregoing as my own I have hereto affixed my signature in the presence of two witnesses.

ALEXANDER HARDEE CONNELL.

Witnesses:
C. W. MARTIN,
T. M. YOUNG.